July 26, 1927.
J. F. PANYARD
PISTON RING
Filed June 8, 1922
1,636,833
2 Sheets-Sheet 1
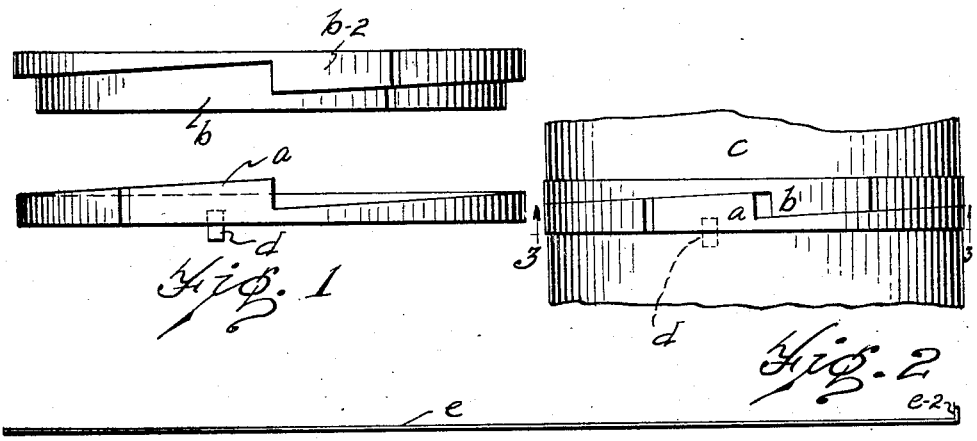
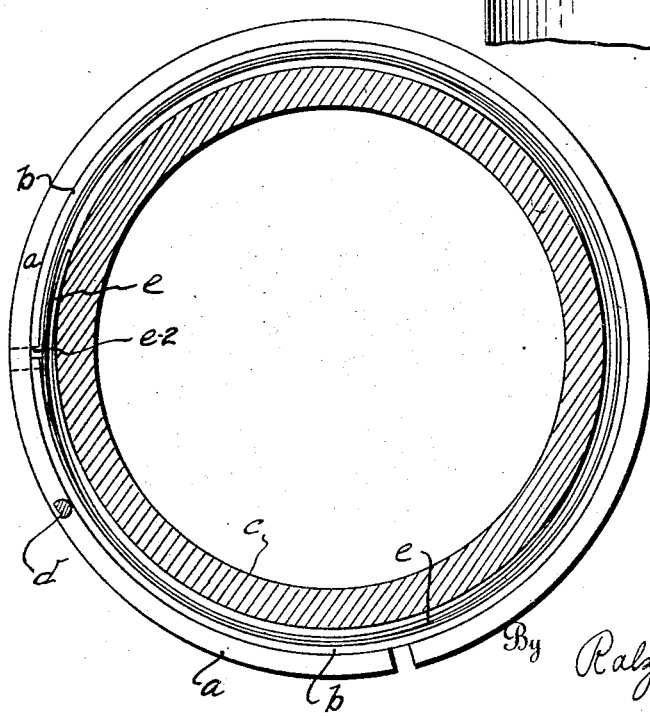
Inventor
John F. Panyard
By Ralzemond A. Parker
Attorney July 26, 1927.

J. F. PANYARD

PISTON RING

Filed June 8, 1922

John F. Panyard, Inventor

By Ralzemond A. Parker
Attorney

Patented July 26, 1927.

1,636,833

UNITED STATES PATENT OFFICE.

JOHN F. PANYARD, OF DETROIT, MICHIGAN.

PISTON RING.

Application filed June 8, 1922. Serial No. 566,875.

My invention relates to improvements in piston packing. The object is to provide piston packing intended primarily for use in connection with internal combustion engines, which packing will maintain high compression and prevent oil pumping.

Further, an object is to provide in connection with a piston provided with the usual annular groove, piston packing which will form a close fitting joint with the cylinder wall and with the side walls of the groove in the piston and prevent leakage at such points, which packing is so constructed and arranged as to automatically accommodate itself during use to compensate for wear.

More particularly, an object is to provide piston packing comprising in part a rotatably movable ring section so constructed and arranged on the piston that maintenance of pressure thereon tending to produce rotation thereof will force the ring tightly against the side walls of the groove within which it is mounted, thereby preventing leakage around the ring within the groove.

The above and other objects together with the details of construction and operation will more fully appear from the following description of the several embodiments of my invention appearing in the drawings, in which:

Figure 1 is a side elevation of a preferred form of my improved ring showing the upper and lower ring sections separated from each other.

Fig. 2 is a broken away side elevation of a piston fitted with the rings shown in Fig. 1.

Fig. 3 is an enlarged sectional view taken on the line 3—3 of Fig. 2.

Fig. 4 is a plan of a suitable spring for use with the ring shown in Fig. 1.

Figs. 5, 6, 7 and 8 show separate modifications of my improved ring.

Figure 6:
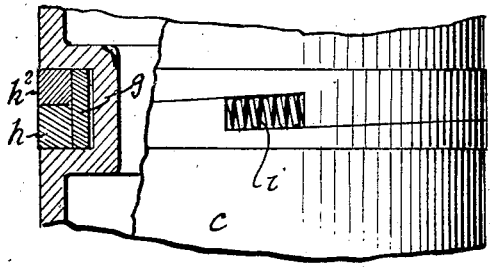

My improved piston packing comprises preferably a plurality of relatively movable longitudinal ring sections disposed within a groove in the piston, which sections are so constructed and arranged that when pressure is brought to bear thereon to produce relative rotatable movement of said sections, the separate sections are wedged tightly against the side walls of the groove to prevent leakage at such points.

As shown in Figs. 1 to 3 inclusive, I provide a ring of resilient material formed in two longitudinal complementary sections $a$ and $b$, which sections are mounted within an annular groove formed in the piston $c$. The section $a$ is anchored against rotation within the groove by means of a pin $d$ but is movable laterally endwise the piston so as to closely hug the side wall of the groove. The section $b$ is substantially L-shaped in cross-sectional area and the base of the L rests in the bottom of the groove. The section $a$ seats within the cut-out portion of the section $b$. The radially-extending portion $b^2$ of the section $b$ is tapered lengthwise the ring. The section $a$ is likewise tapered lengthwise the ring but in the opposite direction from the section $b$, so that when section $b$ is rotated relative section $a$ against the taper, the ring expands laterally against the side wall of the groove.

I have found it desirable to provide a spring $e$ formed as shown in Figs. 3 and 4. These views illustrate a straight spring which is flexed within the circumference of the ring sections to provide a plurality of concentric coils positioned between the ring sections in the bottom of the piston groove. When so coiled the spring exerts outward pressure on the ring sections more completely throughout their circumference than is the case with the use of a single spring coil which ordinarily engages the ring at a limited number of points to force the same outwardly against the cylinder wall. This spring is turned outwardly as at $e^2$ to engage over the end of the rotatable ring section $b$ and exert rotatable pressure thereon tending to rotate the same relative the anchoring section, which rotatable tension, by virtue of the taper of the said sections, expands the ring laterally within the groove, wedging the same against the side walls thereof.

The rotatable travel of the movable ring section relative the anchored section would not have to be of great extent to take up for wear. The taper might be as pronounced as desired, and the amount of rotatable travel depends upon the extent of taper. The expansive force maintained in constant and will accommodate for wear during use.

In Fig. 5 a modified form is shown. Similar to the construction shown in Figs. 1 to 3, I here provide a pair of ring sections but each section is movable within the groove. The sections here shown are inherently resilient and bear outwardly against the cylinder wall. The lateral expansive force is maintained by a spiral spring $f$ positioned between end shoulders formed on the sections $a$ and $b$, respectively. This spring exerts a pressure tending to produce rotation of such sections relative each other and against the taper of said sections. In this case the ring groove in the piston might preferably be cut away to a greater depth and width than that shown in Fig. 2 so as to accommodate a ring of sufficient cross-sectional area to permit the construction here shown.

In Fig. 6 another modification is shown. A base ring $g$ is provided upon which the tapered ring sections $h$ and $h^2$ seat. This base ring is positioned in the bottom of the groove. A spiral spring $i$ similar to the spring $f$ previously described is provided between the movable ring sections. The disposal and action of this spring is similar to that previously described in connection with the spring $f$. The ring sections could possess self-contained resiliency sufficient to hold them outwardly against the cylinder wall, or separate spring means might be provided.

Figure 7:
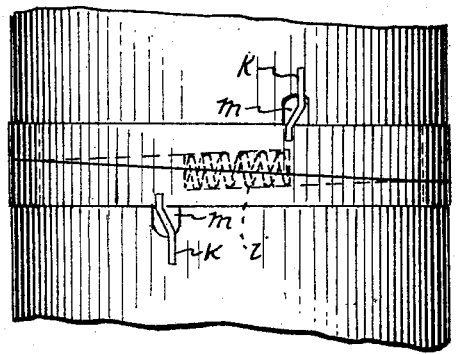

Fig. 7 shows yet another modification. A pair of ring sections similar to those described in Fig. 5 are provided but the ring sections are not anchored in the piston except as hereinafter described. Spring members $k$ are provided, which spring members are secured to the piston within recesses $m$. The spring members extend endwise the piston into the ring groove, as shown. A notch is provided in each ring section to receive the projecting ends of the springs $k$. Each spring is bent as shown in Fig. 7, to exert pressure on the ring section engaged thereby tending to hold the same rotatably toward the taper of the opposite ring section. The limit of movement is the limit prescribed by the size of the recess $m$ and the structure of the springs. If desired, a plurality of these springs might be provided for each ring section.

Figure 8:
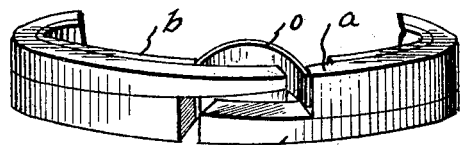
Figure 10:
Fig. 10 is a perspective of the spring construction used in connection with the ring shown in Fig. 8.
Figure 9:
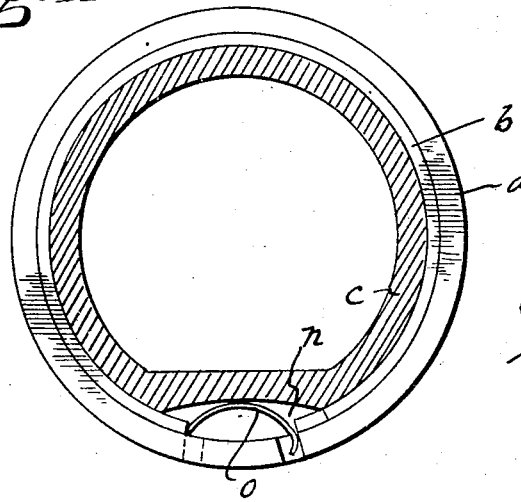
Fig. 9 is a plan view of the ring shown in Fig. 8.

Figs. 8, 9 and 10 show yet another modification, in which appears a different form of spring construction. The ring sections are very similar to that shown in Fig. 1. The spring construction, however, is different. The piston is cut away as at $n$ to receive a curved spring $o$ concaved outwardly when in position. The opposite ends of this spring exert outward tension on opposite ends of the pair of ring sections $a$ and $b$. The base flange of the section $b$ is engaged at one end by the spring $o$, and this base flange is cut away at the opposite end beyond the radially-extending portion $b^2$ of the section $b$ so that the opposite end of the spring $o$ engages the overhanging end of the ring section $a$, the spring being formed with a portion of less width at one end, as shown in Fig. 10, to ride over the radially-extending portion of the ring section $b$ and engage the adjacent end of the ring section $a$. The ring sections are, therefore, held in opposite directions to exert rotatable force against the taper of the sections to the end herein above described.

Figure 11:
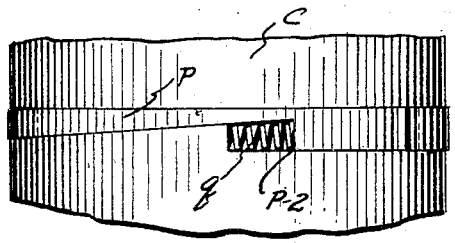
Fig. 11 is a side elevation of a piston provided with a modified form of my improved ring.

Fig. 11 shows yet another modification in which but one ring section $p$ is provided. In this case one side wall of the groove is itself tapered lengthwise the groove. The ring section is tapered so that when positioned in the groove the taper extends in the opposite direction. I have shown expansive means in the form of a spiral spring $q$ engaging at one end the shoulder $p^2$ of the tapered groove and at the other end a shoulder $p^2$ formed in the ring so as to hold the ring rotatable around the piston against its taper. It is evident a different form of spring construction might be used in this connection.

What I claim is:

In piston packing, a piston having a groove for packing, packing in said groove comprising a pair of split expansible cooperating ring sections having helical meeting faces, one of said sections having a base flange substantially the width of the bottom of the groove seated therein, the other ring section seated upon the base flange of the first ring section between its helical face and the opposite side wall of the groove, one of said ring sections being rotatable relative to the other, and spring means engaging said section to exert rotatable pressure thereon counter its helical face.

In testimony whereof, I sign this specification.

JOHN F. PANYARD.